United States Patent
Isomura et al.

(10) Patent No.: US 8,299,908 B2
(45) Date of Patent: Oct. 30, 2012

(54) TIRE PRESSURE MONITORING SYSTEM AND PRESSURE MONITORING UNIT

(75) Inventors: Makoto Isomura, Saitama (JP); Makoto Bessho, Saitama (JP)

(73) Assignee: Honda Motor Co., Ltd.

(*) Notice: Subject to any disclaimer, the term of this patent is extended or adjusted under 35 U.S.C. 154(b) by 322 days.

(21) Appl. No.: 12/787,658

(22) Filed: May 26, 2010

(65) Prior Publication Data

US 2010/0302063 A1 Dec. 2, 2010

(30) Foreign Application Priority Data

May 27, 2009 (JP) ................................ 2009-127908

(51) Int. Cl.
*B60C 23/00* (2006.01)
(52) U.S. Cl. .......... 340/442; 340/447; 340/449; 73/146; 73/146.2; 73/146.3; 73/146.4; 701/34.4; 701/29.6
(58) Field of Classification Search ................. 701/34.4, 701/29.6; 73/146, 146.2, 146.3, 146.4; 340/442, 340/447, 449
See application file for complete search history.

(56) References Cited

U.S. PATENT DOCUMENTS

| | | | |
|---|---|---|---|
| 6,954,687 B2 | 10/2005 | Taguchi et al. | |
| 6,965,305 B2 | 11/2005 | Taguchi et al. | |
| 7,661,299 B2 | 2/2010 | Kusunoki | |
| 8,009,027 B2 * | 8/2011 | Thomas et al. | 340/447 |

FOREIGN PATENT DOCUMENTS

| | | |
|---|---|---|
| JP | 2000-142044 A | 5/2000 |
| JP | 2002-321511 A | 11/2002 |
| JP | 2003-154825 A | 5/2003 |
| JP | 2004-082853 A | 3/2004 |
| JP | 2004-114898 A | 4/2004 |
| JP | 2005-349958 A | 12/2005 |
| JP | 3815305 B2 | 8/2006 |
| JP | 2008-184018 A | 8/2008 |

* cited by examiner

*Primary Examiner* — Arnold Kinkead

(74) *Attorney, Agent, or Firm* — Carrier Blackman & Associates, P.C.; Joseph P. Carrier; William D. Blackman

(57) ABSTRACT

A tire pressure monitoring system distinguishes a mounted tire from a non-mounted tire, and which automatically changes over IDs and tire-pressure thresholds without any exclusive apparatuses. A tire pressure monitoring unit stores an identification code of a tire pressure sensor unit and a tire-pressure set value as a pair. While a vehicle is traveling at a speed equal to or faster than a predetermined vehicle speed, if an identification code received within a predetermined time coincides with any one of identification codes of registered tires and the number of coinciding identification codes is equal to the number of tires, and, at least one of the coinciding identification codes is an identification code other than specified identification codes, the specified identification codes are replaced with those coinciding identification codes which are newly specified as respective identification codes of tire pressure sensor units mounted in tires mounted on the vehicle.

8 Claims, 8 Drawing Sheets

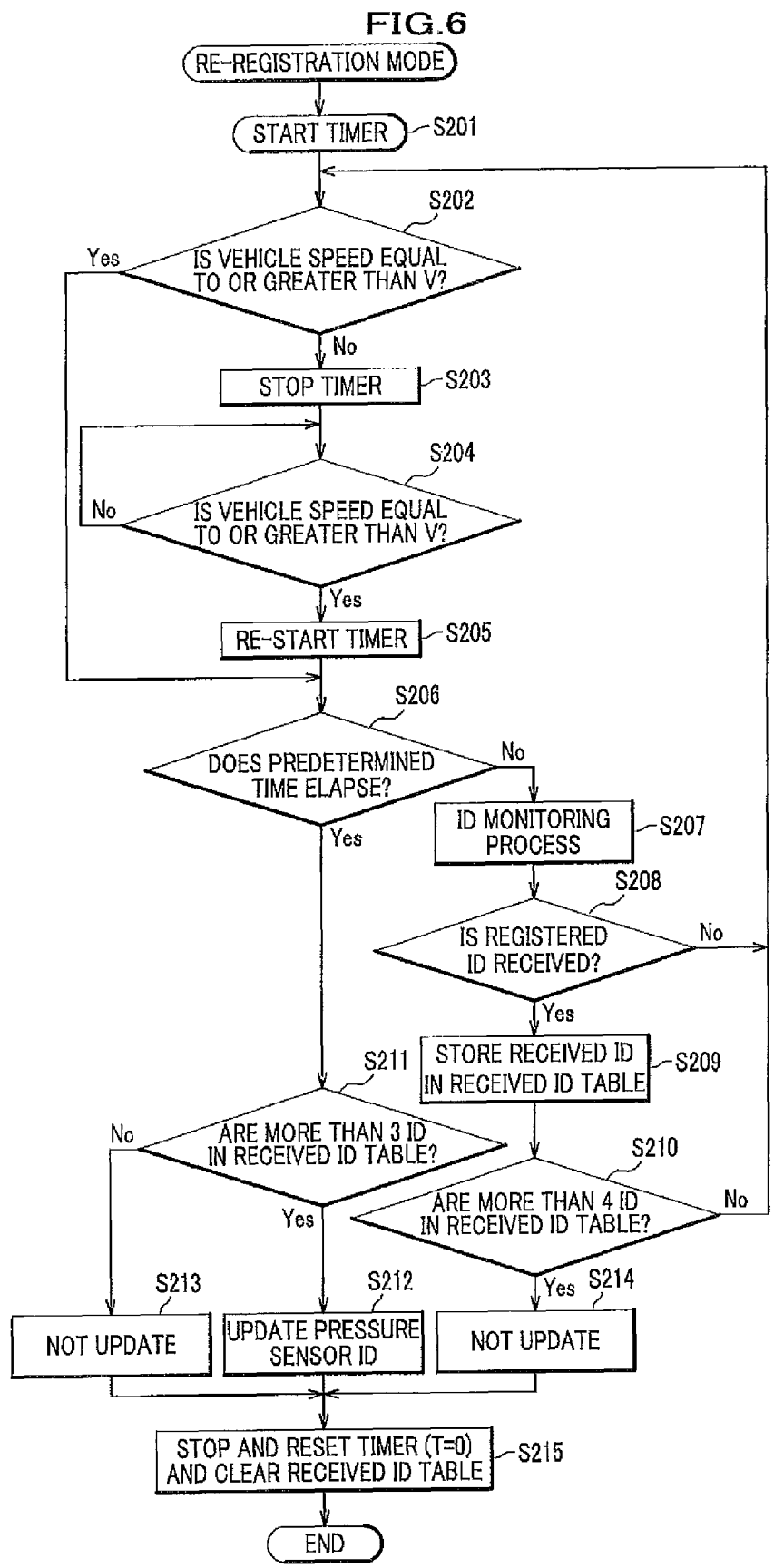

TIRE PRESSURE MONITORING SYSTEM AND PRESSURE MONITORING UNIT

CROSS REFERENCE TO RELATED APPLICATION

This application claims the foreign priority benefit under Title 35, United States Code, §119(a)-(d) of Japanese Patent Application No. 2009-127908, filed on May 27, 2009 in the Japan Patent Office, the disclosure of which is herein incorporated by reference in its entirety.

BACKGROUND OF THE INVENTION

1. Field of the Invention

The present invention relates to a tire pressure monitoring system which directly measures a tire pressure.

2. Description of the Related Art

A TPMS (Tire Pressure Monitoring System) monitors pressures of respective tires while a vehicle is traveling, and notifies reduction of a tire pressure to the driver of the vehicle when the pressure of a tire decreases while the vehicle is traveling. Installation of such a TPMS in a vehicle to be newly sold becomes an obligation in North America.

TPMSs can be roughly divided into an indirect type and a direct type (sensor type).

A typical example of the indirect type is an ABS (Anti-lock Braking System) type which uses a wheel speed sensor of ABS provided for each wheel. As the sensor of an existing system can be used, measurement (estimation) of a tire pressure can be realized inexpensively.

Conversely, the direct type (sensor type) directly measures a tire pressure through an (air) pressure sensor while a vehicle is traveling, and transmits a measured value to a receiving unit in a vehicle main body by means of a radio wave, thereby directly measuring the tire pressure. The direct type has a higher reliability than the indirect type.

Because the direct type TPMS transmits a tire pressure to the receiving unit in the vehicle main body by a radio wave, it is necessary for the TPMSs to store the identification numbers (ID) of respective pressure sensors in order to distinguish running tires mounted on a local vehicle from tires mounted on other vehicles.

Accordingly, when, for example, wheels are changed from those of normal tires (summer tires) to those of studless tires (winter tires), it is requisite to register the sensor IDs in a monitoring unit provided in the vehicle main body at a dealer, etc., using a special apparatus. Thereafter, when the wheels are changed back from those of the winter tires to those of the normal tires (summer tires), it is necessary to register the sensor IDs of the wheels of the normal tires (summer tires) again.

According to the TPMS disclosed in Japan Patent No. 3815305, when a centrifugal force sensor provided in a pressure sensor of a spare wheel (spare tire) loaded in a local vehicle or of a wheel loaded for replacement is activated due to hard vibration originating from a rough road and the tire pressure sensor unit transmits data on a tire pressure even though such wheel is not mounted as a running wheel, the monitoring unit may wrongly register the sensor ID of that tire pressure sensor unit as the sensor ID of the running wheel.

Japan Patent No. 3815305 discloses that the sensor ID of a monitoring target is only changed, and changing of a set value (determination threshold) tire by tire for properly determining tire pressure reductions are not taken into consideration. Moreover, replacement of plural wheels (tire set) such as replacement from wheels of summer tires to wheels of winter tires is not taken into consideration of disclosure of Japan Patent No. 3815305.

SUMMARY OF THE INVENTION

An aspect of the present invention provides a tire pressure monitoring system and a pressure monitoring unit which can save time and effort inherent to replacement of a wheel.

The present invention may provide a tire pressure monitoring system which stores an identification code of a tire pressure sensor unit provided with a prepared mounting wheel and a tire-pressure set value as a pair in a pressure monitoring unit, where a number of the mounting wheels greater than the number of running wheels of a vehicle, are prepared. While the vehicle is traveling at a speed equal to or greater than a predetermined vehicle speed, when identification codes in tire-pressure data received within a predetermined time coincide with identification codes stored as the identification codes of prepared mounting wheels and the number of coinciding identification codes, excluding any received identification code which is a duplicate of another received identification code, is equal to the number of the running wheels of the vehicle, and, at least one of the coinciding identification codes is an identification code other than the identification codes of the running wheels actually mounted on the vehicle, data on a running wheel is updated.

Moreover, the present invention provides an in-vehicle pressure monitoring unit used for a vehicle and involving a number of prepared mounting wheels each of which is provided with a tire pressure sensor unit, wherein a predetermined wheel among the prepared mounting wheels being selected as a running wheel and mounted on the vehicle, at least one of the other/stand-by prepared mounting wheels being selected later as a running wheels and mounted on the vehicle, replacing at least one of the running wheels actually mounted on the vehicle.

The pressure monitoring unit updates current mounting information using identification information acquired while the vehicle is traveling to monitor a tire pressure.

The pressure monitoring unit of the present invention may transition to a mode of executing a process of updating the current information on running wheels mounted to the vehicle with a predetermined condition being used as a trigger.

According to the present invention, the current mounting information is updated upon a predetermined condition like when an ignition switch is turned on.

The pressure monitoring unit of the present invention may have information list including stand-by wheel information and current running wheel mounting information. Moreover, the information list, the current running wheel mounting information, and tire pressure set value are stored as a table as a whole.

According to the present invention, various formats of information can be provided.

The pressure monitoring unit of the present invention may cause the tire pressure sensor unit to, when the detection value of the centrifugal force sensor becomes equal to or greater than the predetermined value, transmit the tire-pressure data at a higher frequency than a frequency when the detection value of a centrifugal force sensor is less than a predetermined value.

According to the present invention, energy saving of the tire pressure sensor unit and accelerated updating of the current running wheel mounting information in the pressure monitoring unit can be both accomplished.

The pressure monitoring unit of the present invention executes a process of updating the current running wheel mounting information using tire-pressure data when a vehicle speed acquired from a vehicle speed sensor mounted on the vehicle is further greater than a vehicle speed corresponding to a predetermined value for a detection value by the centrifugal force sensor.

According to the present invention, updating of the current running wheel mounting information can be carried out appropriately.

The pressure monitoring unit and the tire pressure sensor units provided with the prepared mounting wheels of the present invention constitute a tire pressure monitoring system, and such system is configured such that it does not transmit an instruction from the pressure monitoring unit to any of the tire pressure sensor units.

According to the present invention, the benefit of updating the current mounting information increases.

According to the present invention, there is provided a tire pressure monitoring system, etc., which can save time and effort inherent to replacement of a wheel.

BRIEF DESCRIPTION OF THE DRAWINGS

FIG. 6 is a flowchart for explaining the flow of the re-registration mode of re-registering mounted tire ID information by the tire pressure monitoring system of the embodiment of the present invention;

DETAILED DESCRIPTION OF THE PREFERRED EMBODIMENT

An explanation will be given of an embodiment of the present invention with reference to the accompanying drawings.

Figure 1:
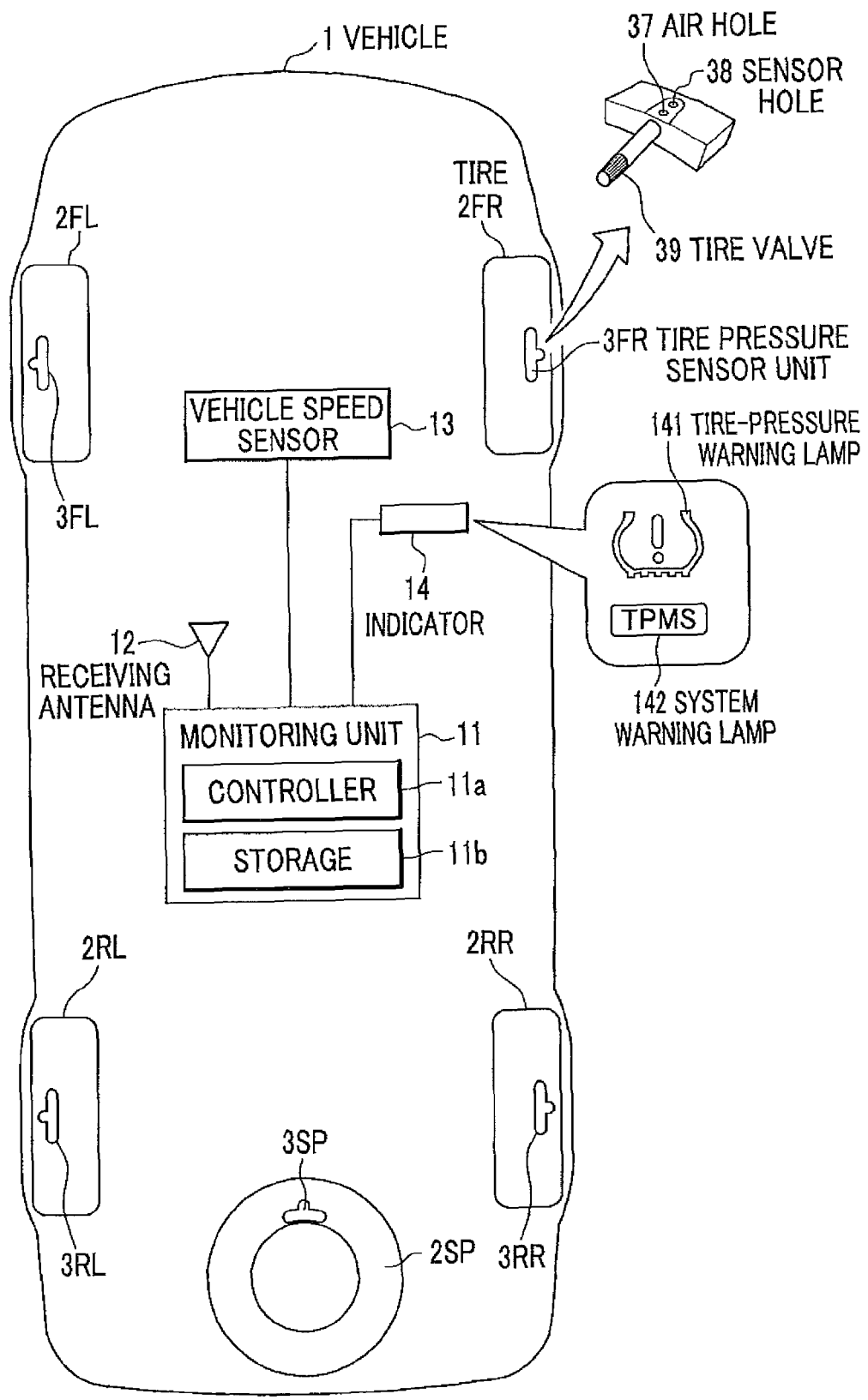
FIG. 1 is a diagram showing a system configuration of a vehicle equipped with a tire pressure monitoring system according to an embodiment of the present invention.

FIG. 1 is a diagram showing a system configuration of a vehicle equipped with a tire pressure monitoring system according to the embodiment of the present invention.

As shown in FIG. 1, a vehicle 1 has a front part of the vehicle 1 that is drawn at the upper part of the diagram, the vehicle 1 is of a four-wheel vehicle having four rotating wheels (i.e., running wheels) of a front-right tire 2FR, a front-left tire 2FL, a rear-right tire 2RR, and a rear-left tire 2RL, and further has a spare tire 2SP loaded in the rear part of the vehicle 1. The tires 2FR, 2FL, 2RR, 2RL and 2SP have a tire pressure monitored by respective tire pressure sensor units 3FR, 3FL, 3RR, 3RL and 3SP.

Note that a word "wheel" stands for a combination of a wheel and a tire attached thereto, but in the present embodiment, a word "wheel" and a word "tire" are equivalently used. In the following explanation, "replacement of a tire" means replacement of a whole of a wheel with a tire. Furthermore, a mounted tire means a tire actually mounted on an axle of the vehicle 1 and used for running (equivalent to a term "running wheel" in claims), indicates any one of or all of the front-right tire 2FR, the front-left tire 2FL, the rear-right tire 2RR, and the rear-left tire 2RL, and is distinguished from the spare tire 2SP loaded in the vehicle 1. Conversely, a term "tire pressure sensor unit 3" indicates any one of or all of the tire pressure sensor units 3FR, 3FL, 3RR, 3RL, and 3SP, and is not particularly distinguished from the tire pressure sensor unit 3SP of the spare tire 2SP.

<<Pressure Monitoring Unit 11>>

The vehicle 1 includes a monitoring unit (pressure monitoring unit) 11 for monitoring a tire pressure (a pressure in a chamber between the inner peripheral surface of a tire and the rim face of a wheel).

The monitoring unit 11 comprises a controller 11a and a storage 11b, and is electrically connected to a receiving antenna 12, a vehicle speed sensor 13, and an indicator 14.

The monitoring unit 11 receives a radio signal transmitted from respective tire pressure sensor units 3 through the receiving antenna 12, and acquires data on a tire pressure, data on a temperature, etc. The monitoring unit 11 compares the acquired tire pressure with a tire-pressure set value registered in the storage 11b in the monitoring unit 11, thereby detecting reduction of a tire pressure. When detecting reduction of the tire pressure, the monitoring unit 11 causes the indicator 14 of a display unit at the front of the driver's side to indicate the reduction of the tire pressure. Such processes of the monitoring unit 11 are comprehensively controlled by the controller 11a.

The indicator 14 includes a tire-pressure warning lamp 141 for causing a driver to recognize reduction of a tire pressure, and a system warning lamp 142 for causing the driver to recognize a system malfunction of the TPMS.

<<Tire Pressure Sensor Unit 3>>

A general contour of the tire pressure sensor unit 3 is shown in the upper-right part of FIG. 1. As the tire pressure sensor unit 3 is mounted on the rim face of a wheel, the tire pressure sensor unit 3 has a bottom face (a bottom face in FIG. 1) curved so as to tightly contact the rim face. The tire pressure sensor unit 3 also has an upper face (an upper face in FIG. 1) provided with an air hole 37 directly connected to a tire valve 39, and a sensor hole 38 connected to a sensor-installation space. According to this example, the tire pressure sensor unit 3 is mounted on a wheel, but may be attached in a tire.

A configuration of the tire pressure sensor 3 and an outline thereof will be explained with reference to FIG. 2.

Figure 2:
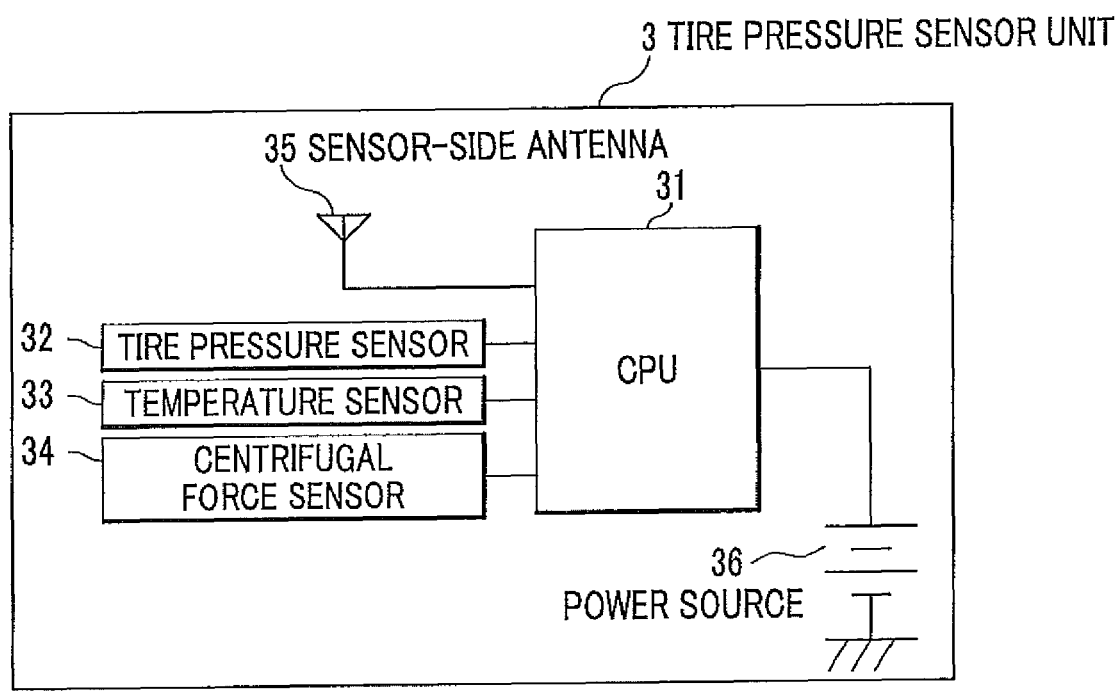
FIG. 2 is a diagram showing a configuration of a tire pressure sensor unit.

FIG. 2 is a diagram showing the configuration of a tire pressure sensor unit.

The pressure sensor 3 includes a CPU (Central Processing Unit) 31 which executes a predetermined process while inputting/outputting data relative to a non-illustrated memory, a tire pressure sensor 32 which detects a pressure in a tire 2, a temperature sensor 33 which detects a temperature in the tire 2, and a centrifugal force sensor 34 which detects centrifugal force generated by a rotation of the tire 2.

The centrifugal force sensor 34 is for detecting any force in a radial direction generated as the tire 2 rotates, and detects that the tire 2 is rotating, i.e., the tire 2 is an mounted tire (running tire) used for the vehicle 1 to run.

Respective outputs by the tire pressure sensor 32, the temperature sensor 33, and the centrifugal sensor 34 are converted into digital values through an A/D (Analog/Digital) converter (not illustrated), and are input into the CPU 31.

The tire pressure sensor unit 3 also includes a power source (e.g., a lithium battery) 36 which functions as a power source for the CPU 31 to operate.

Furthermore, the tire pressure sensor unit 3 includes a sensor-side antenna 35.

The following is how the tire pressure sensor unit 3 realizes the TPMS.

The CPU 31 acquires pieces of data measured by the tire pressure sensor 32 and by the temperature sensor 33 for each predetermined sampling interval (e.g., for each three to four seconds). Latest tire-pressure data among pieces of the tire-pressure data acquired by the tire pressure sensor 32 and the temperature sensor 33 is wirelessly transmitted to the monitoring unit 11 via the sensor-side antenna 35 at a predetermined interval.

In a case in which the output by the centrifugal force sensor 34 is equal to or greater than a predetermined value (acceleration threshold), e.g., in a case in which the output by the centrifugal force sensor 34 is equal to or greater than an acceleration corresponding to centrifugal force generated by rotation of the tire 2 when the vehicle 1 travels at a vehicle speed of 22 to 23 km/h, the CPU 31 determines that the tire 2 to which the corresponding tire pressure sensor unit 3 is mounted is a running wheel used for running, and frequently (e.g., for each one minute) transmits data on a tire pressure to the monitoring unit 11 (see FIG. 1) via the sensor-side antenna 35.

Conversely, when the output by the centrifugal force sensor 34 is less than the acceleration threshold such that the vehicle 1 is stopping and parked or the tire 2 is not mounted on the vehicle 1, the CPU 31 terminates transmission of data on a tire pressure or transmits the data at a low frequency (e.g., for each one hour) to save the power source 36.

Note that when the output by the centrifugal force sensor 34 is less than the acceleration threshold, power supply to the tire pressure sensor 32 and to the temperature sensor 33 may be cut off.

<<Tire-Pressure Data 3a>>

Figure 3:
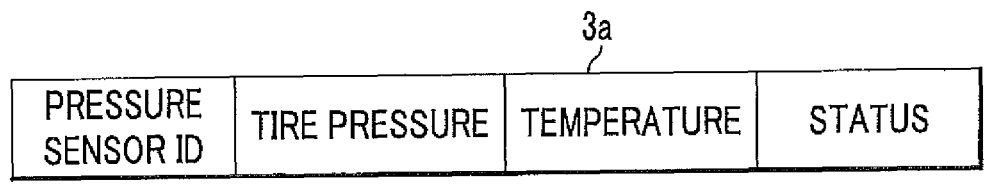
FIG. 3 is a diagram showing a data format of tire-pressure data that the tire pressure sensor unit transmits to a monitoring unit.

FIG. 3 is a diagram showing a data configuration of tire-pressure data that the tire pressure sensor unit 3 transmits to the monitoring unit 11.

As shown in FIG. 3, tire-pressure data 3a to be transmitted to the monitoring unit 11 includes pieces of information indicating a pressure sensor ID of the tire pressure sensor unit 3, a value of a tire pressure measured by the tire pressure sensor 32, a temperature in the tire measured by the temperature sensor 33, and a status of the tire pressure sensor unit 3 such as a remaining battery level (voltage level) or presence/absence of an abnormality.

The pressure sensor ID is an identification code allocated to the tire pressure sensor unit 3 one by one. In the present embodiment, because the tire pressure sensor unit 3 is prepared for the vehicle 1 with being mounted on the wheel, the pressure sensor ID also indicates an ID of a wheel (tire).

<<Storage 11b of Monitoring Unit 11>>

Figure 4:
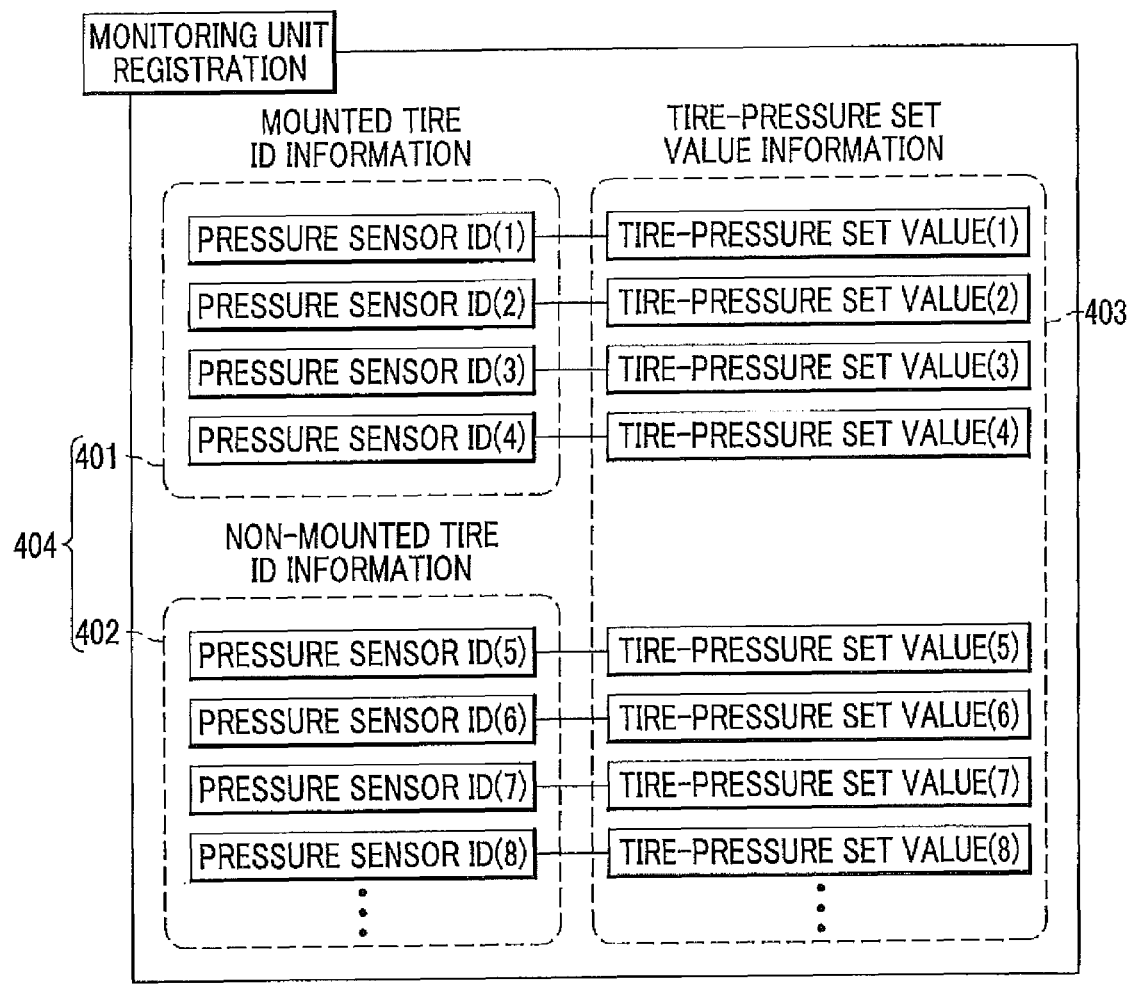
FIG. 4 is a diagram showing a pressure sensor ID and a tire-pressure set value both registered in a storage of the monitoring unit.

FIG. 4 is a diagram showing a pressure sensor ID and a tire-pressure set value both registered in the storage of the monitoring unit.

The storage 11b of the monitoring unit 11 has three registration areas for mounted tire ID information 401, non-mounted tire ID information 402, and tire-pressure set value information 403, respectively.

A pressure sensor ID corresponding to the mounted tire of the vehicle 1 is registered beforehand in the mounted tire ID information 401. Because the vehicle 1 has four running tires, four pressure sensor IDs are registered in the mounted tire ID information 401.

Registered beforehand in the non-mounted tire ID information 402 is a pressure sensor ID of a non-mounted tire (a stand-by wheel for attachment), such as the spare tire 2SP loaded in the vehicle 1 or a tire (e.g., a set of winter tires) not currently mounted on the vehicle 1.

The tire-pressure set value information 403 registers tire-pressure set values beforehand so that one tire-pressure set value corresponds to one pressure sensor ID. Note that the tire-pressure set value is a threshold (determination threshold) for determining reduction of a tire pressure.

A term "registered tire" is a collective term for a mounted tire and a non-mounted tire registered in the storage 11b of the monitoring unit 11 beforehand. When the mounted tire is a currently-mounted tire, the non-mounted tire is a stand-by tire which is to be selected later and to be mounted on the vehicle 1.

Note that in FIG. 4, (1) registered in the "mounted tire ID information 401" is "current mounting information" indicating which tire (wheel) 2 identified by the pressure sensor ID of the tire pressure sensor unit 3 is actually mounted on the vehicle 1 as a mounted tire (running wheel) (indicating a correspondence between a mounting wheel currently mounted on the vehicle as the running wheel and an identification code of the tire pressure sensor unit mounted on the running wheel). Moreover, (2) registered in the "non-mounted tire ID information 402" is "stand-by wheel information" indicating which tire (wheel) 2 identified by the pressure sensor ID of the tire pressure sensor unit 3 is a non-mounted tire (a stand-by wheel for attachment) of the vehicle 1 (a correspondence between an identification code of the tire pressure sensor unit mounted on a wheel as a stand-by mounting wheel for the vehicle). Furthermore, (3) registered in the "tire-pressure set value information 403" is "pressure set value information" indicating a correspondence between a pressure sensor ID of the tire pressure sensor unit 3 mounted on the tire 2 (wheel) and tire-pressure set value (determination threshold) of the tire 2 (wheel).

A combination of the pressure sensor ID registered in the "mounted tire ID information 401" and the pressure sensor ID registered in the "non-mounted tire ID information 402" corresponds to "information list 404" indicating to which pressure sensor ID the tire pressure sensor unit 3 of the tire 2 (wheel) prepared as a mounting wheel (registered tire) for the vehicle 1 corresponds.

As is clear from FIG. 4, a pressure sensor ID (the identification code of a tire pressure sensor unit) and a set tire pressure value (determination threshold) are stored as a pair.

The contents (registration contents) that the storage 11b stores in FIG. 4 may be in the form of a table as a whole, but may be in other forms.

<<Activation of Re-Registration Mode>>

Figure 5:
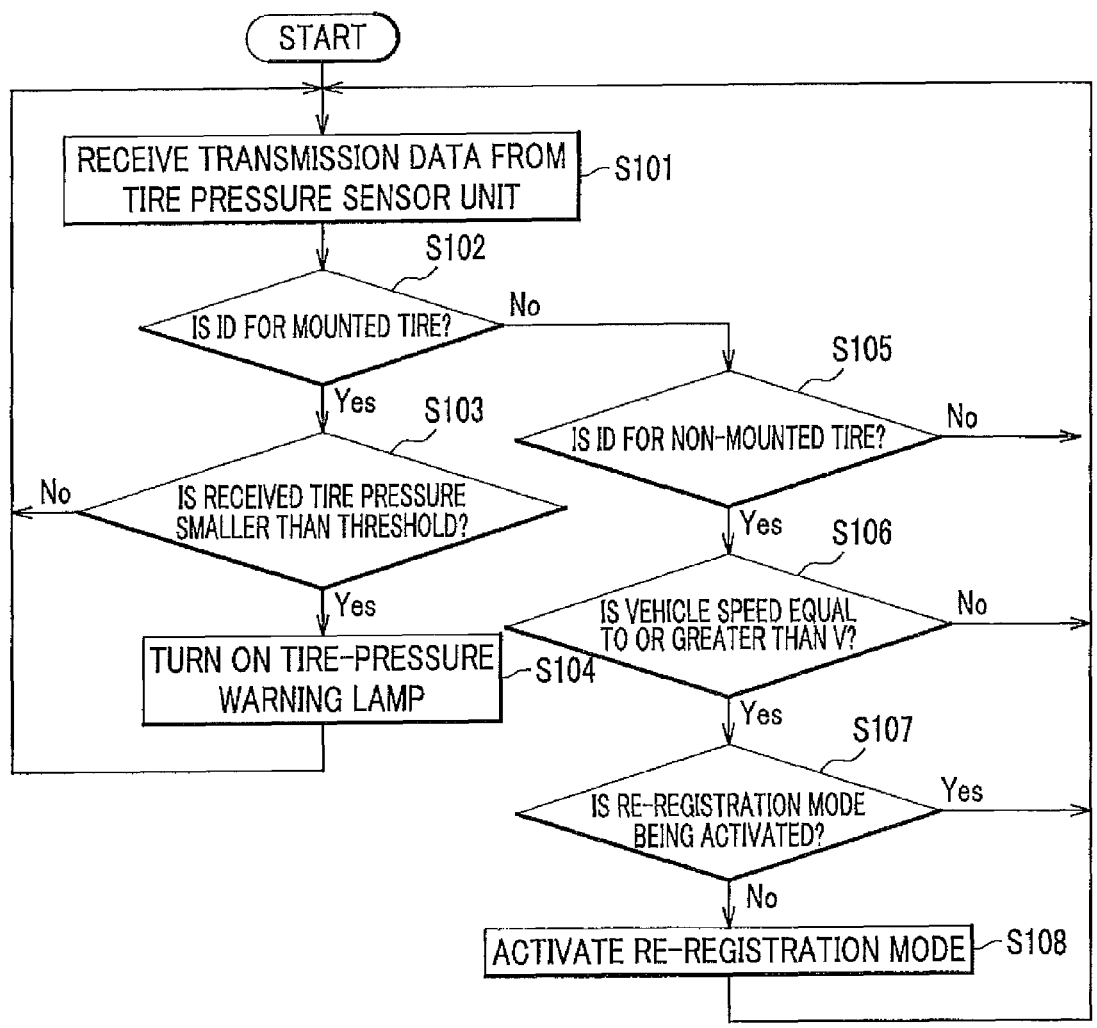
FIG. 5 is a flowchart for explaining a normal monitoring process and activation of a re-registration mode executed by the tire pressure monitoring system of the embodiment of the present invention.

Next, an explanation will be given of a normal monitoring process for a tire pressure and activation of a re-registration mode with reference to FIG. 5. FIG. 5 is a flowchart for explaining the normal monitoring process and activation of the re-registration mode executed by the tire pressure monitoring system of the present embodiment.

According to the present embodiment, when the vehicle 1 is traveling at a speed equal to or greater than a predetermined vehicle speed (vehicle speed threshold V) and when a pressure sensor ID in received tire-pressure data 3a is an ID registered in the non-mounted tire ID information 402, the TPMS has transition in the process to the re-registration mode (see FIG. 6) of updating the mounted tire ID information 401. The explanation will be given below with reference to FIG. 5.

The monitoring unit 11 is activated when the ignition is turned on, and starts monitoring (the normal monitoring process) of tire pressures.

First, the monitoring unit 11 receives tire-pressure data 3a from the tire pressure sensor unit 3 (step S101), and determines whether or not the pressure sensor ID (see FIG. 3) in the received tire-pressure data 3a is an ID (an ID of a running wheel mounted on the vehicle 1) registered in the mounted tire ID information 401 of the storage 11b of the monitoring unit 11 (step S102: ID for mounted tire?).

When the received pressure sensor ID is the ID registered in the mounted tire ID information 401 (step S102: YES), the monitoring unit 11 determines whether or not a value of a tire pressure (see FIG. 3) included in the received tire-pressure data 3a is smaller than a tire-pressure set value (see FIG. 4) corresponding to the pressure sensor ID registered in the tire-pressure set value information 403 of the storage 11b of the monitoring unit 11 (step S103: smaller than threshold?).

When the value of the received tire pressure is larger than the corresponding tire-pressure set value (step S103: NO), the monitoring unit 11 determines that the pressure of the tire 2 corresponding to the received pressure sensor ID has not decreased, and continues the normal monitoring process (return to step S101).

Conversely, when the value of the received tire pressure is smaller than the corresponding tire-pressure set value (step S103: YES), the controller 11a of the monitoring unit 11 causes the tire-pressure warning lamp 141 (see FIG. 1) of the indicator 14 to light up to cause the driver to recognize reduction of the tire pressure (step S104).

On the other hand, when the received pressure sensor ID is not the ID registered in the mounted tire ID information 401 (step S102: NO), the monitoring unit 11 determines whether or not the received pressure sensor ID (see FIG. 3) is same as any one of IDs registered in the non-mounted tire ID information 402 (see FIG. 4) of the storage 11b of the monitoring unit 11 (step S105). When the received pressure sensor ID is same as any one of the IDs registered in the non-mounted tire ID information 402, this means that a wheel to which the tire pressure sensor unit 3 identified by that pressure sensor ID is attached is an mounting wheel prepared for the vehicle 1.

When the received pressure sensor ID is not the ID registered in the non-mounted tire ID information 402 (step S105: NO), the monitoring unit 11 continues the normal monitoring process (return to step S101).

This is a case in which, for example, the monitoring unit 11 receives tire-pressure data 3a from an mounted tire of another vehicle traveling side by side.

Conversely, when the received pressure sensor ID is the ID registered in the non-mounted tire ID information 402 (step S105: YES), the monitoring unit 11 determines whether or not the speed of the vehicle 1 measured by the vehicle speed sensor 13 (see FIG. 1) is equal to or greater than the vehicle speed threshold V (step S106). The vehicle speed threshold V is set to be a higher value (e.g., 40 km/h) than the vehicle speed (e.g., 22 to 23 km/h) which causes the tire pressure sensor unit 3 to determine that the vehicle 1 is traveling and to transmit tire-pressure data. Because the tire pressure sensor unit 3 does not frequently transmit tire-pressure data when the vehicle 1 is parked or traveling at a low speed, the vehicle speed threshold V is set to be a slightly grater value in order to surely activate the re-registration mode with transmission of tire-pressure data being frequently carried out. The vehicle speed threshold V corresponds to "a vehicle speed that is further greater than a vehicle speed corresponding to the predetermined value in the detected value of the centrifugal force sensor" in claim 6.

When the vehicle speed is smaller than the vehicle speed threshold V (step S106: NO), because there is a possibility that sufficient numbers of tire-pressure data 3a are not collected, the monitoring unit 11 doest not start the re-registration mode, and returns the flow to the normal monitoring process (return to step S101).

When the vehicle speed is equal to or faster than the vehicle speed threshold V (step S106: YES), the monitoring unit 11 checks that the re-registration mode has not been activated already (step S107: NO), and activates the re-registration mode (step S108).

When the re-registration mode has been already activated (step S107: YES), the monitoring unit 11 keeps executing the normal monitoring process (return to step S101).

<<Re-Registration Mode>>

An explanation will be given of the re-registration mode of re-registering a pressure sensor ID of an mounted tire (running wheel) in the mounted tire ID information 401 with reference to FIG. 6. FIG. 6 is a flowchart for explaining the flow of the re-registration mode of re-registering a pressure sensor ID of a mounted tire (running wheel) in the mounted tire ID information 401 by the tire pressure monitoring system of the embodiment.

Note that the process of the re-registration mode is subjected to parallel processing with the normal monitoring process shown in FIG. 5.

The monitoring unit 11 starts a non-illustrated timer built in the monitoring unit 11 (step S201).

When the speed of the vehicle 1 measured by the vehicle speed sensor 13 (see FIG. 1) becomes smaller than the vehicle speed threshold V (e.g., 40 km/h) (step S202: NO), the monitoring unit 11 stops the timer (step S203). When the vehicle speed becomes equal to or greater than the vehicle speed threshold V (e.g., equal to 40 km/h or faster) again (step S204: YES), the monitoring unit 11 restarts the timer again (step S205).

Before a predetermined time (e.g., 19 minutes) elapses (step S206: NO), the monitoring unit 11 starts an ID monitoring process (step S207).

First, the monitoring unit 11 determines whether or not a pressure sensor ID in received tire-pressure data 3a is an ID registered in the mounted tire ID information 401 or in the non-mounted tire ID information 402 (step S208).

When receiving the pressure sensor ID registered in the mounted tire ID information 401 or in the non-mounted tire ID information 402 (step S208: YES), the monitoring unit 11 stores the received pressure sensor ID in a received ID table provided in a temporal memory area of the storage 11b of the monitoring unit 11.

The received ID table is for temporality storing the received pressure sensor ID in the re-registration mode. In this example, the received ID table does not duplicatingly store the same pressure sensor ID. That is, pressure sensor IDs of different kinds (numbers) are stored in the received ID table except duplicating information.

Next, the monitoring unit 11 determines whether or not there are equal to or greater than five kinds of pressure sensor IDs stored in the received ID table (step S210).

When the number of pressure sensor IDs is equal to or less than four kinds (step S210: NO), the process from the step S202 to the step S210 is repeated again until the predetermined time in the step S206 elapses, and the monitoring unit 11 successively stores received pressure sensor IDs.

Conversely, when the number of pressure sensor IDs stored in the received ID table is equal to or greater than five kinds (step S210: YES), because the number of mounted tires to the vehicle 1 is four, the monitoring unit 11 determines that a pressure sensor ID from a non-mounted tire is also received, and does not update pressure sensor IDs registered in the mounted tire ID information 401 (step S214), stops and resets the timer, and clears the received ID table, thereby forcibly terminating the re-registration mode (step S215).

When the number of pressure sensor IDs stored in the received ID table does not become equal to or greater than five kinds and the predetermined time elapses (step S206: YES), the monitoring unit 11 determines whether or not the pressure sensor IDs stored in the received ID table is four kinds (step S211).

When the number of pressure sensor IDs stored in the received ID table is not four kinds (step S211: NO), the monitoring unit 11 does not update the mounted tire ID information 401 (step S213), and terminates the process as explained above (step S215).

This may occur because a sensor malfunctions or a tire not registered in the monitoring unit 11 is mounted on the vehicle 1, and a configuration of causing the system warning lamp 142 of the indicator 14 to light up to notify the driver such event may be employed in this case.

When the number of pressure sensor IDs stored in the received ID table is four kinds (step S211: YES), the monitoring unit 11 performs re-registration in such a manner as to replace the pressure sensor IDs already registered in the mounted tire ID information 401 with the four kinds of pressure sensor IDs stored in the received ID table to update the pressure sensor IDs registered in the mounted tire ID information 401 (step S212), and terminates the re-registration mode (step S215). This updating corresponds to an operation "newly specifies the coinciding identification code as an identification code of the tire pressure sensor unit mounted on the running wheel of the vehicle" in claim 1 and an operation "updates the current mounting information in the storage using the read identification code" in claim 2.

Thereafter, the monitoring unit 11 executes the normal monitoring process using the pressure sensor IDs registered in the updated mounted tire ID information 401 (return to step S101 in FIG. 5).

A flow of the re-registration mode from the activation thereof to the termination thereof will be explained in more detail with reference to FIGS. 7A to 9B.

Figure 7B:
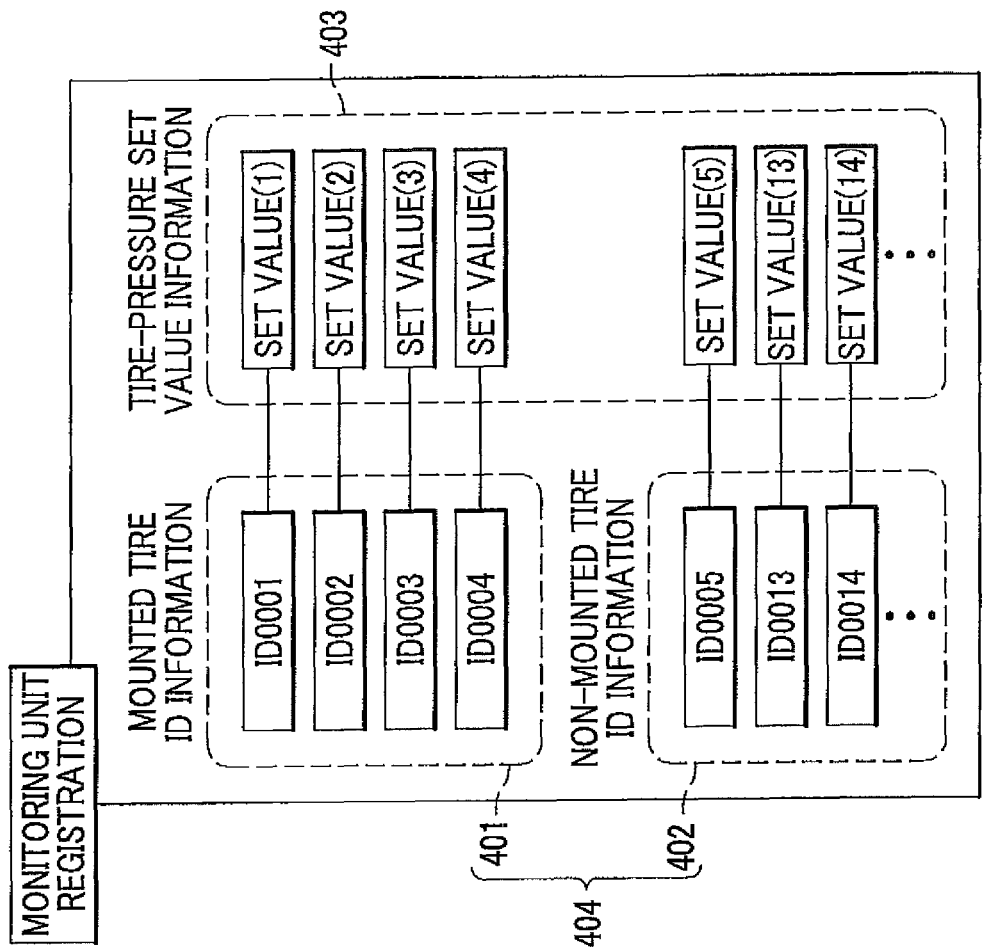
FIG. 7B is a diagram showing mounting tire ID information registered in the monitoring unit.
Figure 7A:
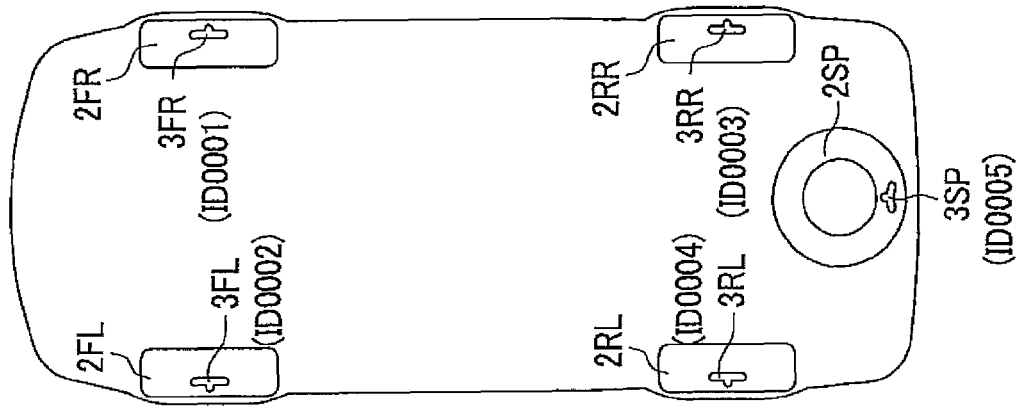
FIG. 7A is a diagram showing pressure sensor IDs of tires mounted on a vehicle and that of a tire loaded in the vehicle.

FIG. 7A is a diagram showing pressure sensor IDs of tires mounted on the vehicle 1 and that of a tire loaded in the vehicle.

As shown in FIG. 7A, an explanation will be given of an example case in which the mounted tires are the front-right tire 2FR (ID0001), the front-left tire 2FL (ID0002), the rear-right tire 2RR (ID0003), and the rear-left tire 2RL (ID0004), and the spare tire 2SP (ID0005) is loaded in the vehicle 1 as the non-mounted tire.

Moreover, as shown in FIG. 7B, registered in the mounted tire ID information 401 in the storage 11b of the monitoring unit 11 are four pressure sensor IDs: ID0001; ID0002; ID0003; and ID0004, and it is assumed that the vehicle is traveling at a speed equal to or greater than the vehicle speed threshold V.

First, an explanation will be given of a case in which the vehicle 1 is subjected to hard vibration due to a rough road.

Because of the rough road, when the centrifugal force sensor 34 in the tire pressure sensor unit 3SP of the spare tire 2SP loaded in the vehicle 1 is activated by vibration and tire-pressure data 3a (see FIG. 3) including the ID0005 is transmitted, the monitoring unit 11 which has received such data proceeds the process through the step S101, the step S102, the step S105, the step S106, the step S107, and the step S108 in FIG. 5, and inevitably activates the re-registration mode (step S108).

In the re-registration mode, the process proceeds from the step S201 to the step S209, and the monitoring unit 11 stores the ID0005 of the spare tire 2SP in the received ID table in the storage 11b.

However, because the vehicle 1 is traveling, pieces of data are successively transmitted from respective mounted tires 2FR, 2FL, 2RR, and 2RL, so that the ID0005, the ID0001, the ID0002, the ID0003, and the ID0004 are stored in the received ID table while the process is repeated from the step S202 to the step S210.

As the fifth pressure sensor ID is stored in the received ID table, the process proceeds from the step S210 to the step S214, and further progresses to the step S215, thereby forcibly terminating the re-registration mode without updating the mounted tire ID information.

As explained above, even if the tire pressure sensor unit 3 of the spare tire 2SP transmits data due to vibration applied to the spare tire 2SP loaded in the vehicle, it is possible for the TPMS to suppress any wrong registration of a pressure sensor ID in the mounted tire ID information 401.

Figure 8B:
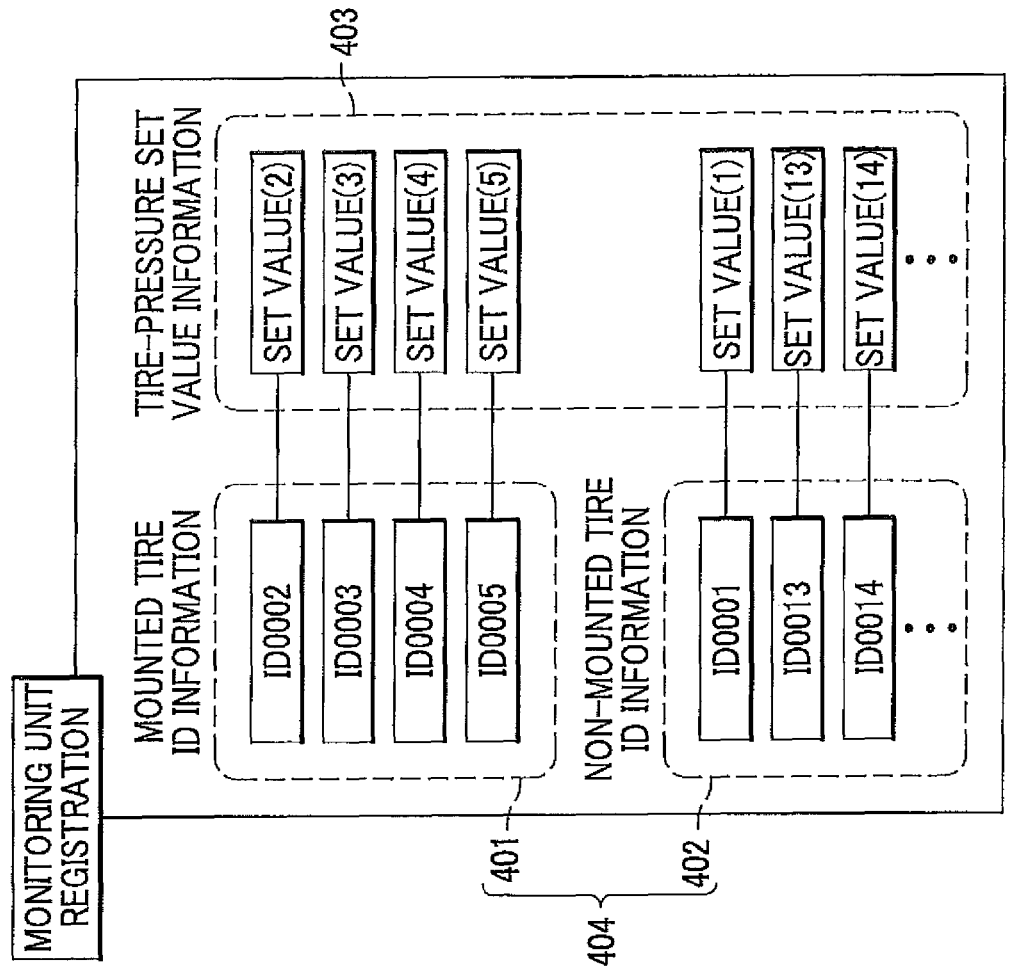
FIG. 8B is a diagram showing mounting tire ID information registered in the monitoring unit.

Next, an explanation will be given of a case in which the front-right tire 2FR is replaced with the spare tire 2SP with reference to FIGS. 8A and 8B.

Figure 8A:
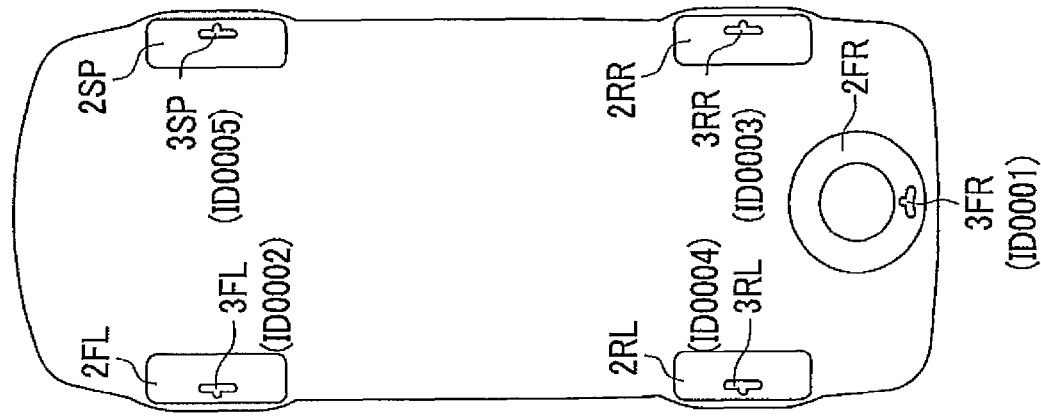
FIG. 8A is a diagram showing a condition in which a front-right tire is replaced with a spare tire.

FIG. 8A is a diagram showing a condition in which the front-right tire 2FR is replaced with the spare tire 2SP.

Registered in the mounted tire ID information 401 of the storage 11b of the monitoring unit 11 right after the replacement are four pressure sensor IDs: ID0001; ID0002; ID0003; and ID0004 (see FIG. 7B).

As the vehicle 1 travels, the tire pressure sensor unit 3SP transmits tire-pressure data 3a including the ID0005, and the monitoring unit 11 which has received such data progresses in the process through the step S101, S102, S105, S106, S107, and S108 in FIG. 5, and activates the re-registration mode (step S108).

In the re-registration mode, the process progresses from the step S201 to the step S209 shown in FIG. 6, and the ID0005 of the spare tire 2SP is stored in the received ID table of the storage 11b of the monitoring unit 11.

Moreover, as the vehicle 1 is traveling, pieces of data are successively transmitted from respective mounted tires 2FL, 2RR, and 2RL, and the ID0005, the ID0002, the ID0003, and the ID0004 are stored in the received ID table while the process is repeated from the step S202 to the step S210.

When the number of pressure sensor IDs stored in the received ID table until the predetermined time elapses is four, the process progresses through the step S206, the step S211, and the step S212, the ID0002, the ID0003, the ID0004, and the ID0005 stored in the received ID table are re-registered in the mounted tire ID information 401, and the re-registration mode is terminated. Accordingly, the pressure sensor IDs registered in the mounted tire ID information 401 in the storage 11b of the monitoring unit 11 become as shown in FIG. 8B. Thereafter, in the normal monitoring process, a tire pressure is monitored for a wheel (i.e., the running wheel) to which the tire pressure sensor unit 3 identified by the pressure sensor ID which is the same as that registered in the mounted tire ID information 401 having undergone re-registration is mounted.

As explained above, because the pressure sensor ID are automatically changed over, any re-registration work of the IDs at a dealer or the like becomes unnecessary when the tire is replaced. Note that the pressure sensor ID (ID0001) of the tire 2FR which becomes a non-mounted tire is registered in the non-mounted tire ID information 402 in the step S212.

Moreover, in the normal monitoring process after re-registration, the tire pressure sensor unit 3SP transmits tire-pressure data 3*a* including the ID0005, and the monitoring unit 11 which has received such data progresses the process from the step S101 to the step S103 in FIG. 5. In this process, because the monitoring unit 11 monitors reduction of a tire pressure using a set value (5) which is a tire-pressure set value corresponding to the ID0005 as shown in FIG. 8B as a determination threshold for a tire pressure, it is possible for the TPMS to cope with a difference in the tire-pressure set value for each tire.

At the end, an explanation will be given of a case in which the rear-right tire 2RR and the rear-left tire 2RL are replaced with other tires 22RR and 22RL, respectively, from the condition shown in FIG. 7A with reference to FIGS. 9A and 9B. It is assumed that the other tires 22RR and 22RL are placed as stand-by tires in a motor garage or the like for the vehicle 1.

Figure 9A:
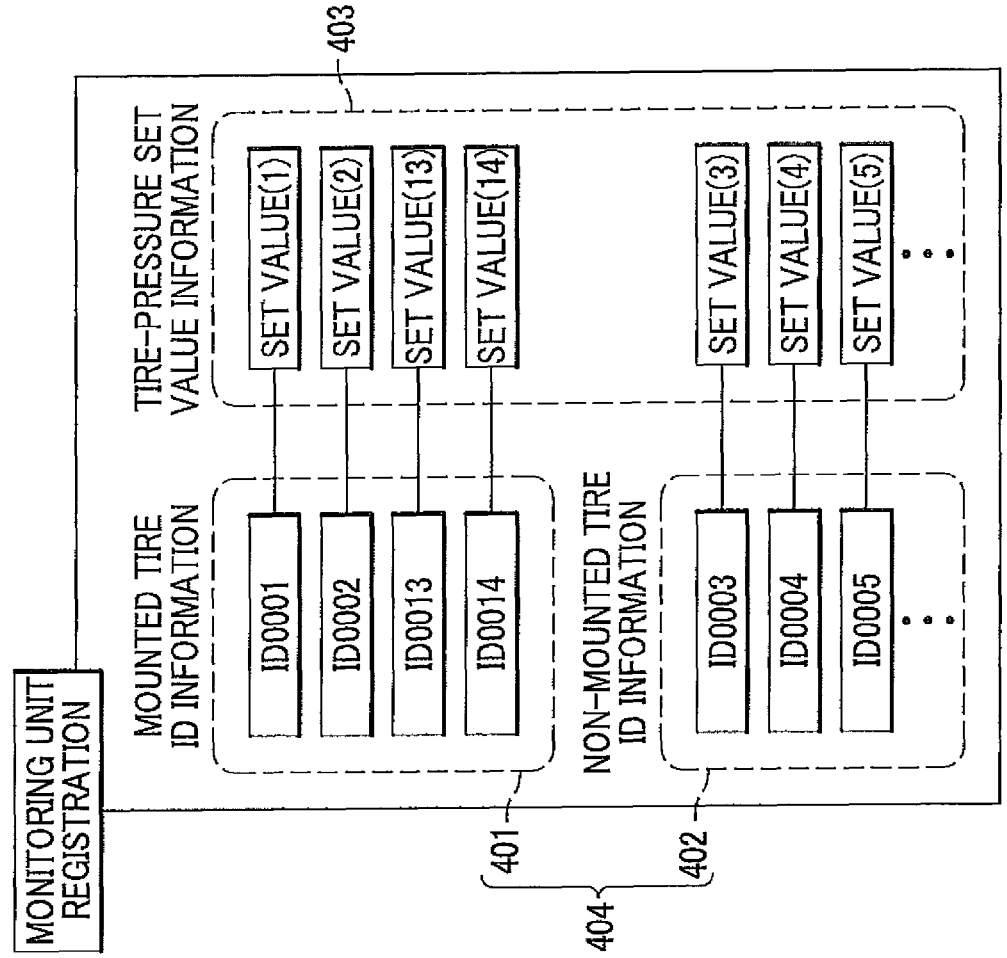
FIG. 9A is a diagram showing a condition in which a rear-right tire and a rear-left tire are replaced.
Figure 9B:
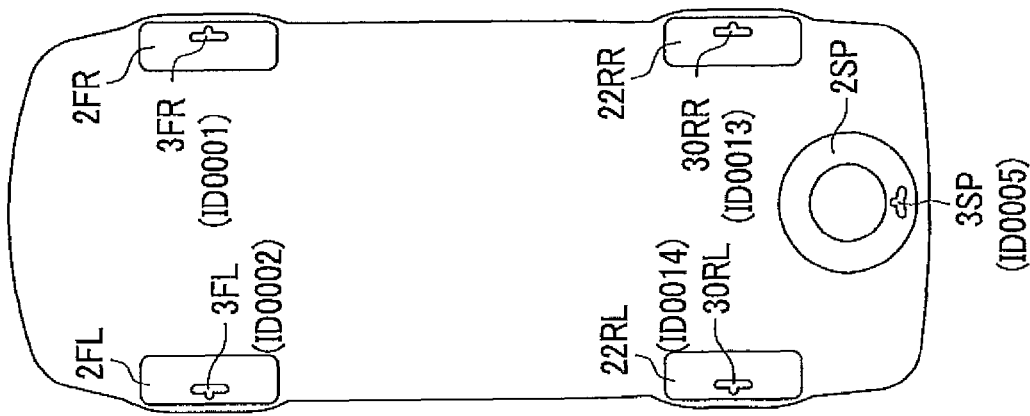
FIG. 9B is a diagram showing mounting tire ID information registered in the monitoring unit.

FIG. 9A is a diagram showing a condition in which the rear-right tire and the rear-left tire are replaced.

Registered in the mounted tire ID information 401 in the storage 11*b* of the monitoring unit 11 right after the replacement are four pressure sensor IDs: ID0001; ID0002; ID0003; and ID0004 (see FIG. 7B).

As the vehicle 1 travels, a tire pressure sensor unit 30RR transmits tire-pressure data 3*a* including an ID0013, and the monitoring unit 11 which has received such data progresses the process through the steps S101, S102, S105, S106, S107, and S108 in FIG. 5, so that the re-registration mode is activated (step S108).

In the re-registration mode, the process progresses from the step S201 to the step S209, and the ID0013 of the other tire 22RR is stored in the received ID table of the storage 11*b* of the monitoring unit 11.

Moreover, as the vehicle 1 is traveling, pieces of data are successively transmitted from respective mounted tires 2FR, 2FL, and 22RL, so that the ID0013, the ID0001, the ID0002, and an ID0014 are stored in the received ID table while the process is repeated from the step S202 to the step S210.

When the number of pressure sensor IDs stored in the received ID table until the predetermined time elapses is four, the process progresses through the steps S206, S211, and S212, where the ID0013, the ID0001, the ID0002, and the ID0014 stored in the received ID table are re-registered in the mounted tire ID information 401, and the re-registration mode is terminated. Accordingly, the pressure sensor IDs registered in the mounted tire ID information 401 in the storage 11*b* of the monitoring unit 11 become as shown in FIG. 9B, and tire pressures are monitored in the normal monitoring process using the pressure sensor IDs registered in the mounted tire ID information 401 having undergone re-registration. Note that the pressure sensor IDs (ID0003, and ID0004) of the tires 2RR and 2RL which become the non-mounted tires, respectively, are registered in the non-mounted tire ID information 402 in the step S212.

An explanation will be given of a case in which the rear-right tire 22RR and the rear-left tire 22RL are replaced with the tire 2RR and the tire 2RL, respectively, from the condition shown in FIG. 9A later, so that the condition returns to the condition shown in FIG. 7A.

Stored in the mounted tire ID information 401 in the storage 11*b* of the monitoring unit 11 right after the replacement are the four pressure sensor IDs: ID0001; ID0002; ID0013; and ID0014 (see FIG. 9B).

As the vehicle 1 travels, the tire pressure sensor unit 3RR transmits tire-pressure data including the ID 0003, and the monitoring unit 11 which has received such data progresses in the process through the steps S101, S102, S105, S106, S107, and S108, so that the re-registration mode is activated (step S108).

In the re-registration mode, the process progresses from the step S201 to the step S209, and the ID0003 of the tire 2RR is stored in the received ID table of the storage 11*b* of the monitoring unit 11.

Moreover, as the vehicle 1 is traveling, pieces of data are successively transmitted from respective mounted tires 2FR, 2FL, and 2RL, and the ID0003, the ID0001, the ID0002, and the ID0004 are stored in the received ID table while the process is repeated from the step S202 to the step S210.

When the number of pressure sensor IDs stored in the received ID table until the predetermined time elapses is four, the process progresses through the steps S206, S211, and S212, the ID0003, the ID0001, the ID0002, and the ID0004 stored in the received ID table are re-registered in the mounted tire ID information 401, and the re-registration mode is terminated. Accordingly, the pressure sensor IDs registered in the mounted tire ID information 401 of the storage 11*b* of the monitoring unit 11 become as shown in FIG. 7B, and tire pressures are monitored in the normal monitoring process using the pressure sensor IDs registered in the mounted tire ID information 401 having undergone re-registration. Note that the pressure sensor IDs (ID0013, and ID0014) of the tires 22RR, 22RL which become the non-mounted tires, respectively, are registered again in the non-mounted tire ID information 402 in the step S212.

The explanation has been given of example cases in which rear wheels are replaced, but the same is true for a case in which all four wheels are replaced. That is, when wheels are changed from those of summer tires to those of winter tires, and changed again from those of the winter tires to those of the summer tires, if, for example, the pressure sensor IDs of the tire pressure sensor units mounted on those wheels are once registered in the monitoring unit 11 of the vehicle 1 at a dealer or the like, it becomes unnecessary to re-register the pressure sensor IDs at the dealer or the like in subsequent tire replacements, and the pressure sensor IDs after the tire replacement can be automatically re-registered in the mounted tire ID information 401. That is, even if a person who does not know about the TPMS replaces a tire while being in ignorance of a pressure sensor ID, the tire pressure monitoring system (the monitoring unit 11) of the embodiment can function without any problems.

Moreover, the tire pressure monitoring system of the present invention has the same parts configuration as that of conventional TPMSs, which can avoid increasing of a cost inherent to addition of a part like a harness, and a weight increasing of the vehicle 1.

Furthermore, conventional TPMSs cannot change over a tire-pressure set value (determination threshold) for each tire, but according to the present invention, it is possible to change over the tire-pressure set value (determination threshold) for each tire, so that it is possible for the TPMS of the present invention to cope with a difference in a tire-pressure set value tire by tire.

The explanation has been given of the tire pressure monitoring system of the present invention, but the specific configuration thereof is not limited to the foregoing embodiment, and can be changed and modified in various forms without departing from the scope and spirit of the present invention written in claims.

The explanation has been given of a case in which the tire pressure sensor unit 3 is mounted on the wheel, but as explained above, the tire pressure sensor unit 3 may be attached in a tire 2. Moreover, the re-registration mode (see FIG. 6) is activated under a condition (a trigger) in which a pressure sensor ID in received data is for a non-mounted tire, i.e., the pressure sensor ID in the received data is an ID registered in the non-mounted tire ID information 402 (see FIG. 4) (step S105 in FIG. 5). However, the re-registration mode may be activated (so that a mode has transition to a mode of updating current mounting information) with a trigger that the ignition switch is simply turned on. When activation of the ignition switch is taken as a trigger, there may be a case in which merely pressure sensor IDs of the presser sensor units 3 mounted on mounted tires which are actually mounted on the vehicle 1 are stored in the received ID table, but this does not bring in any systematical problems. Note that a pressure sensor ID registered in the non-mounted tire ID information 402 (see FIG. 4) corresponds to "an identification code which coincides with an identification code in the information list but that does not coincide with an identification code in the current mounting information" in claim 3.

The explanation has been given of a case in which the predetermined time is, for example, 19 minutes, but the present invention is not limited to this value. For example, when the transmission interval (one minute in the foregoing embodiment) of tire-pressure data by the tire pressure sensor unit 3 is short, the predetermined time may be shortened from 19 minutes, and when the transmission interval is long, the predetermined time may be extended from 19 minutes. The predetermined time is set in accordance with a purpose and an application. In the foregoing embodiment, a target time until the "mounted tire ID information 401" is updated through the flowchart of FIG. 6 is set to 20 minutes, and 19 minutes which is shorter than that target time is set to be the predetermined time.

What is claimed is:

1. A tire pressure monitoring system for a vehicle in which a number of mounting wheels which is greater than a total number of running wheels to be mounted on the vehicle, are prepared, and some of the prepared mounting wheels are selected and mounted on the vehicle as the running wheels, the system comprising:

tire pressure sensor units are respectively associated with the prepared mounting wheels, each of the tire pressure sensor units comprising a pressure sensor that detects a tire pressure, and a centrifugal force sensor that detects centrifugal force generated by rotation of a tire, and transmits, when a detected value by the centrifugal force sensor becomes equal to or greater than a predetermined value, tire-pressure data including a detected value by the pressure sensor and an identification code uniquely allocated to the tire pressure sensor unit to a pressure monitoring unit provided in the vehicle at a higher frequency than a frequency used when the detected value by the centrifugal force sensor is less than the predetermined value;

the pressure monitoring unit compares the detected value by the pressure sensor in received tire-pressure data with a predetermined determination threshold when an identification code in the received tire-pressure data coincides with an identification code of a tire pressure sensor unit associated with one of the running wheels of the vehicle to monitor reduction of a tire pressure, wherein the pressure monitoring unit stores, for each of the prepared mounting wheels, the identification code of the associated tire pressure sensor unit and a set tire pressure value as a pair, specifies the identification codes of the selected mounting wheels as identification codes of the tire pressure sensor units associated with the running wheels of the vehicle, and when an identification code in tire-pressure data transmitted to the pressure monitoring unit coincides with one of the specified identification codes, checks a tire pressure with a set tire pressure value stored as a pair with the coinciding identification code as the predetermined determination threshold, and when identification codes in tire-pressure data transmitted to the pressure monitoring unit within a predetermined time while the vehicle is traveling at a speed equal to or greater than a predetermined vehicle speed coincide with identification codes stored as identification codes of the prepared mounting wheels, and when a number of coinciding identification codes is equal to a number of running wheels of the vehicle, excluding any received identification code which is a duplicate of another received identification code, and when at least one of the coinciding identification codes is an identification code which is different from the specified identification codes, the pressure monitoring unit automatically replaces the specified identification codes with the coinciding identification codes and newly specifies the coinciding identification codes as identification codes of the tire pressure sensor units associated with the running wheels of the vehicle.

2. An in-vehicle pressure monitoring unit used for a vehicle including plural wheels each of which is provided with a tire pressure sensor unit as a prepared mounting wheel, wherein a predetermined one among the prepared mounting wheels being selected as a running wheel and mounted on the vehicle, and at least one of the other prepared mounting wheels being selected later as a running wheel and mounted on the vehicle, replacing at least one of the running wheels actually mounted on the vehicle, and the pressure monitoring unit together with the tire pressure sensor units of the prepared mounting wheels constituting a tire pressure monitoring system for the vehicle, wherein the pressure monitoring unit comprises:

a storage which stores:

an identification code information list indicating correspondence between the prepared mounting wheels of the vehicle and identification codes of the tire pressure sensor units provided respectively with the prepared mounting wheels;

current mounting information indicating a correspondence between the prepared mounting wheels currently mounted on the vehicle as the running wheels and identification codes of the tire pressure sensor provided respectively with the running wheels; and tire-pressure set value information indicating correspondence between the identification codes of the tire pressure sensor units provided respectively with the prepared mounting wheels and tire-pressure set values associated respectively with the prepared mounting wheels; and a controller that monitors tire pressure using information stored in the storage and tire-pressure data transmitted from the tire pressure sensor units provided respectively with the running wheels, the transmitted tire pressure data including a tire pressure of the running wheel and the identification code of the corresponding tire pressure sensor unit, wherein every predetermined time period the controller determines whether any tire pressure data which it receives from any of the tire pressure sensor units coincides with any of the identification codes in the information list, and when a number of the received identification codes coinciding with any of the identification codes in the information list is identical with a number of the running wheels mounted on the vehicle, excluding any received identification code which is a duplicate of another received identification code, the controller automatically updates the current running wheel mounting information in the storage using the received identification codes, and the controller executes a process of monitoring tire pressure using the tire-pressure set value defined for each running wheel by the tire-pressure set value information and the updated current mounting information.

3. The pressure monitoring unit according to claim 2, wherein the controller transitions to a mode of updating the current mounting information when either the controller receives an identification code which coincides with an identification code in the information list but that does not coincide with one of the identification codes in the current mounting information, or an ignition switch of the vehicle is turned on.

4. The pressure monitoring unit according to claim 2, wherein the information list includes:

stand-by wheel information indicating a correspondence between the identification code of each of the tire pressure sensor units provided with the prepared mounting wheels which are not mounted as running wheels for the vehicle; and the current mounting information.

5. The pressure monitoring unit according to claim 2, wherein each of the tire pressure sensor units of the tire pressure monitoring system, comprises:

a pressure sensor that detects a tire pressure; and a centrifugal force sensor that detects centrifugal force generated by rotation of a wheel, and when a detected value by the centrifugal force sensor becomes equal to or greater than a predetermined value, the tire pressure sensor unit transmits tire-pressure data at a higher frequency than a frequency used when the detected value by the centrifugal force sensor is less than the predetermined value.

6. The pressure monitoring unit according to claim 5, wherein the controller updates the current mounting information using tire-pressure data which is received when a vehicle speed detected by a vehicle speed sensor built in the vehicle is equal to or greater than a vehicle speed that is further greater than a vehicle speed corresponding to the predetermined value in the detected value of the centrifugal force sensor.

7. The pressure monitoring unit according to claim 2, wherein the information list, the current mounting information, and the tire-pressure set value information are stored as a table as a whole.

8. The pressure monitoring unit according to claim 2, wherein the tire pressure monitoring system is configured such that it does not transmit any instruction from the pressure monitoring unit to any of the tire pressure sensor units.

* * * * *